(12) United States Patent
Nakamura et al.

(10) Patent No.: US 7,891,458 B2
(45) Date of Patent: Feb. 22, 2011

(54) STEERING SYSTEM FOR ENGINEERING VEHICLE

(75) Inventors: Kazunori Nakamura, Tsuchiura (JP);
Tsuyoshi Nakamura, Tsuchiura (JP);
Kouji Ishikawa, Kasumigaura (JP);
Hiroyuki Azuma, Ushiku (JP);
Kentarou Itoga, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 12/303,288

(22) PCT Filed: Dec. 7, 2007

(86) PCT No.: PCT/JP2007/073640

§ 371 (c)(1),
(2), (4) Date: Dec. 3, 2008

(87) PCT Pub. No.: WO2008/075568

PCT Pub. Date: Jun. 26, 2008

(65) Prior Publication Data
US 2009/0255750 A1    Oct. 15, 2009

(30) Foreign Application Priority Data
Dec. 21, 2006 (JP) ............................ 2006-344438

(51) Int. Cl.
*B62D 5/06* (2006.01)
(52) U.S. Cl. .................. 180/422; 180/420; 180/421; 180/418
(58) Field of Classification Search .................. 180/422, 180/420, 421, 418
See application file for complete search history.

(56) References Cited

U.S. PATENT DOCUMENTS

| 4,116,001 A * | 9/1978 | Orth ............................ 60/420 |
| 4,144,946 A * | 3/1979 | Melocik ...................... 180/442 |
| 5,862,879 A * | 1/1999 | Eberhart ..................... 180/422 |
| 5,941,338 A * | 8/1999 | Miller et al. ................ 180/421 |
| 7,357,215 B2 * | 4/2008 | Nakashima ................. 180/403 |
| 7,610,988 B2 * | 11/2009 | Porskrog et al. ............ 180/417 |
| 2002/0088664 A1 * | 7/2002 | Juul et al. ................... 180/418 |
| 2005/0087386 A1 * | 4/2005 | Hennemann et al. ........ 180/418 |
| 2010/0044143 A1 * | 2/2010 | Porskrog et al. ............ 180/421 |

FOREIGN PATENT DOCUMENTS

| JP | 61-221425 | 10/1986 |
| JP | 63-111366 | 7/1988 |
| JP | 1-154974 | 10/1989 |
| JP | 04-228371 | 8/1992 |
| JP | 06-313408 | 11/1994 |
| JP | 10-45014 | 2/1998 |

* cited by examiner

*Primary Examiner*—Lesley Morris
*Assistant Examiner*—Marlon A Arce
(74) *Attorney, Agent, or Firm*—Mattingly & Malur, P.C.

(57) ABSTRACT

A priority valve 7 is disposed between a hydraulic pump 2 and a steering valve 4 and is used to supply priority steering cylinders 103a and 103b with pressurized oil discharged from the hydraulic pump 2 by controlling the differential pressure across a meter-in hydraulic line of the steering valve 4 such that the differential pressure is kept at a target value. A pressure sensor 31 for detecting the load pressures of the steering cylinders 103a and 103b is provided. On the basis of the detected load pressures, the target value set for the priority valve 7 is modified by devices including a controller 32, a solenoid valve 33, a pilot hydraulic line 29, and a pressure receiving unit 24c of the priority valve 7. The above configuration enables suppression of a shock occurring at the start of turning of the steering wheel.

4 Claims, 6 Drawing Sheets

STEERING SYSTEM FOR ENGINEERING VEHICLE

TECHNICAL FIELD

The present invention relates to a steering system of an engineering vehicle such as a wheel loader.

BACKGROUND ART

The steering system of an engineering vehicle such as a wheel loader includes: a hydraulic pump; a steering cylinder driven by pressurized oil discharged from the hydraulic pump; and a steering valve for controlling the direction and flow rate of the pressurized oil supplied from the hydraulic pump to the steering cylinder. The steering system switches the steering valve based on the rotational direction and rotational quantity of the steering wheel so that the steering cylinder is controlled. In this case, the switching of the steering valve based on the rotational direction and rotational quantity of the steering wheel is performed by use of a hydraulic steering unit called "Orbit roll" (trade name). Here, the hydraulic steering unit includes: a hydraulic valve that operates in synchronization with the rotational operation of the steering wheel; and a hydraulic motor. The hydraulic steering unit is configured to generate a hydraulic pressure whose flow rate corresponds to the rotational quantity and rotational direction of the steering wheel.

In such a steering system for an engineering vehicle, typically, the hydraulic steering unit is located in a main circuit, and the steering valve is operated with the steering wheel to control the steering cylinder. In this case, a hydraulic valve of the hydraulic steering unit is provided as a steering valve, and the hydraulic pressure generated by the hydraulic valve unit is directly introduced into the steering cylinder.

In contrast to such a typical steering system for an engineering vehicle, a technology is known in which the hydraulic steering unit is used as an operation system of the steering valve so that the rotational operation of the steering wheel can be performed with a small force (for example, patent document 1, JP-U-1-154974).

On the other hand, there is also known a technology in which the operation system of the steering valve is formed by an electric/hydraulic steering unit including a controller and a solenoid valve so that the steering valve is electrically/hydraulically switched (for example, patent document 2, JP-A-10-45014). According to this technology, a rotational operation angle (steering angle) of the steering wheel is detected by a potentiometer, and the detected value is input to a controller. The controller outputs to the solenoid valve a command signal (electric signal) corresponding to the detection value. The solenoid valve, in turn, outputs a control pressure corresponding to the command signal. The control pressure is introduced into a hydraulic switching unit (pressure receiving unit) of the steering valve so that the steering valve is switched.

Patent document 1: JP-U-1-154974
Patent document 2: JP-A-10-45014

DISCLOSURE OF INVENTION

Problems to be Solved by the Invention

In a wheel loader, an example of an engineering vehicle, a pair of steering cylinders is provided between the front part and the rear part of the vehicle body. The steering cylinders are expanded and contracted to bend the front part in the right and left directions with respect to the rear part, whereby steering during traveling is performed. The vehicle front part is formed of a body frame, and a front operating mechanism is provided at its front portion.

In an engineering vehicle such as, for example, a wheel loader, when an operator manipulates the steering wheel by turning it, the weight of the vehicle front part acts on the steering cylinders as a heavy load. Therefore, in steering systems as described in the patent documents 1 and 2, the load pressures of the steering cylinders sharply rise at the start of turning the steering wheel, which results in a shock. This shock deteriorates the operability at the start of turning the steering wheel.

In addition, an engineering vehicle such as a wheel loader often needs to operate its front operating mechanism while traveling. Also in such operation, when the load pressure rises at the start of turning the steering wheel, followed by a shock, work performance and a sense of maneuvering as a whole deteriorate.

An object of the present invention is to provide a steering system for an engineering vehicle which is capable of suppressing a shock occurring at the start of turning the steering wheel.

Means for Solving the Problems (1) In order to achieve the above object, according to one aspect of the present invention, there is provided a steering system for an engineering vehicle, said steering system comprising: a hydraulic pump; a steering cylinder driven by pressurized oil discharged from the hydraulic pump; a steering valve for controlling the direction and flow rate of the pressurized oil supplied from the hydraulic pump to the steering cylinder; and a steering wheel manipulated by an operator, said steering system switching the steering valve based on the rotational direction and rotational quantity of the steering wheel so as to control the steering cylinder, wherein said steering system further includes: a priority valve that is located between the hydraulic pump and the steering valve and that includes setting means for setting a target value of the differential pressure across the steering valve, said priority valve supplying by priority the steering cylinder with the pressurized oil discharged from the hydraulic pump and supplying an operational actuator for driving an operating mechanism with a surplus flow of the pressurized oil, by controlling the differential pressure across the steering valve so that the differential pressure is kept at the target value; pressure detection means for detecting the load pressure of the steering cylinder; and control means for modifying, on the basis of the load pressure detected by the pressure detection means, the target value set by the setting means of the priority valve.

According to the present invention configured in this manner, when the load pressure of the steering cylinder is about to sharply rise at the start of turning the steering wheel, the pressure detection means detects the load pressure, and the control means modifies the target value set for the setting means of the priority valve. Therefore, the target value can be modified such that it decreases in response to a sharp increase of the load pressure, and the differential pressure across the steering valve can also be modified in like manner. As a result, the flow rate of pressurized oil passing through the steering valve can be reduced, and increase in the load pressure of the steering cylinder can be suppressed. This enables suppression of a shock occurring at the start of turning the steering wheel.

(2) In the above-described item (1), preferably, said control means modifies said target value such that when the load pressure is lower than a predetermined value, the target value is a constant value, and when the load pressure exceeds the predetermined value, the target value becomes smaller than the constant value As a result, when the load pressure of the steering cylinder is about to sharply rise at the start of turning the steering wheel, the control means can modify the target value such that it decreases in response to a sharp increase of the load pressure.

(3) In addition, in the above-described item (1), preferably, said control means includes: a solenoid valve that operates with a control current and that outputs a control pressure corresponding to the control current; a pressure receiving unit that is provided for the setting means of the priority valve, the pressure receiving unit changing based on the control pressure the target value set by the setting means; and a controller for calculating, on the basis of the load pressure, a target value to be set for the setting means of the priority valve and for outputting the control current to the solenoid valve so as to set said target value for the setting means.

As a result, on the basis of the load pressure detected by the pressure detection means, the control means can modify the target value set for the setting means of the priority valve.

(4) Moreover, in the above-described item (3), preferably, said controller calculates a modification value for the target value set for the setting means of the priority valve and adds this modification value to a predetermined value to calculate the target value.

As a result, when the load pressure of the steering cylinder is about to sharply rise at the start of turning the steering wheel, the control means can modify the target value such that it decreases in response to a sharp increase of the load pressure.

(5) Furthermore, in the above-described item (3), preferably, said controller calculates a modification coefficient for the target value set for the setting means of the priority valve and multiplies a predetermined value by this modification coefficient to calculate the target value.

Also with the above configuration, when the load pressure of the steering cylinder is about to sharply rise at the start of turning the steering wheel, the control means can modify the target value such that it decreases in response to a sharp increase of the load pressure.

EFFECTS OF INVENTION

The present invention enables suppression of a shock and improvement of the operability at the start of turning the steering wheel.

Moreover, the present invention enables improvement of the work performance when the front operating mechanism is operated with the wheel loader in a traveling state and improvement of a sense of maneuvering as a whole.

DESCRIPTION OF REFERENCE NUMBERS

1 Engine
2 Hydraulic pump
2a Variable displacement control unit
4 Steering valve
5 Steering unit
6a, 6b Pilot hydraulic line
7 Priority valve
7a Inlet port
7b First outlet port
7c Second outlet port
11 Metering valve
12 Gerotor
17a, 17b Hydraulic line
18a, 18b Restrictor
24a, 24b, 24c Pressure receiving unit
25 Spring
26a, 26b Actuator hydraulic line
27, 28, 29 Pilot hydraulic line
31 Pressure sensor
32 Controller
32a Priority-valve target value setting unit
32b Modification value operation unit
32c Addition unit (priority-valve target control value operation unit)
32d Solenoid-valve output pressure operation unit
32e Solenoid-valve control current operation unit
33 Solenoid valve
3ba, 3bb Pressure sensor
100 Wheel loader
101 Vehicle front part
102 Vehicle rear part
103a, 103b Steering cylinder
104 Front operating mechanism
106 Cabin
107 Rear wheel
108 Driver's seat
109 Steering wheel
110 Control lever unit
111 Bucket
112 Lift arm
113 Bucket cylinder
114 Arm cylinder
121 Operational hydraulic circuit

BEST MODES FOR CARRYING OUT THE INVENTION

Embodiments of the present invention will be described below with reference to the accompanying drawings.

Figure 1:
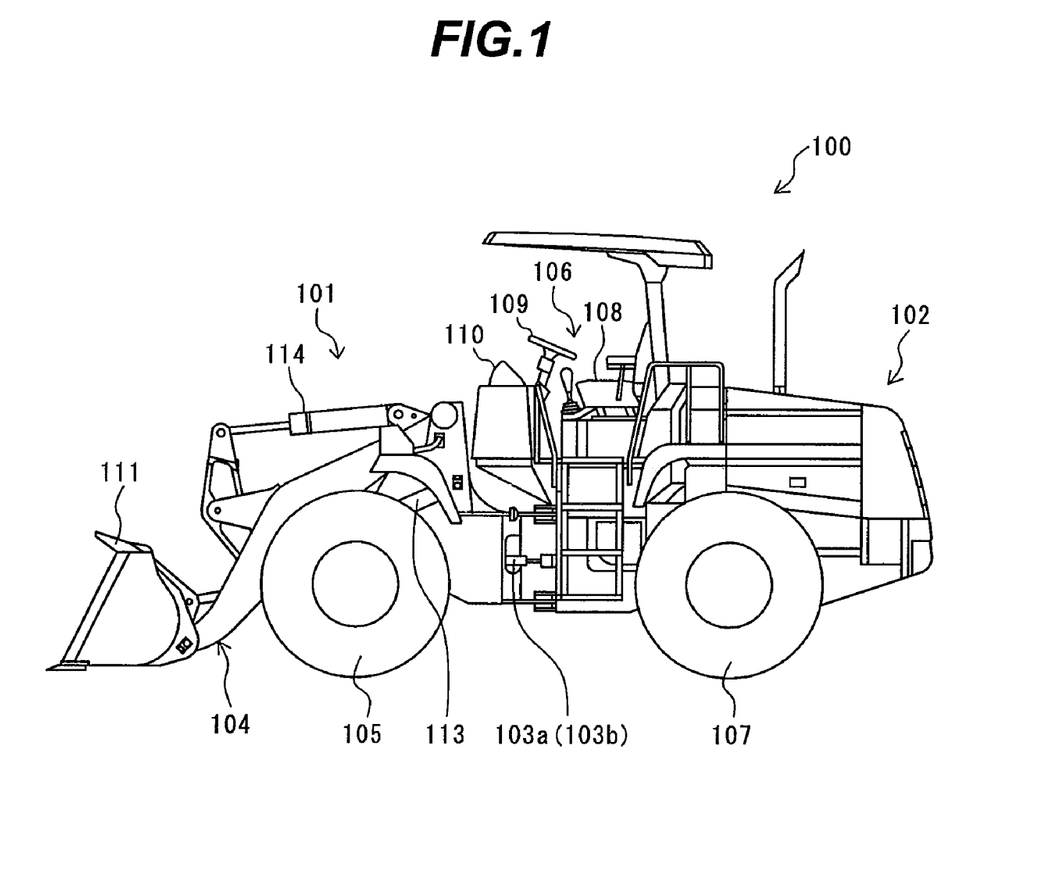
FIG. 1 is a diagram illustrating the appearance of a wheel loader as an example of an engineering vehicle to which the present invention is applied.

FIG. 1 is a diagram illustrating the appearance of a wheel loader as an example of an engineering vehicle to which the present invention is applied.

In FIG. 1, reference numeral 100 denotes a wheel loader. The wheel loader 100 includes the vehicle front part 101 and the vehicle rear part 102. The vehicle front part 101 is pivotally connected to the vehicle rear part 102 such that the direction of the front part 101 can be changed with respect to the rear part 102 by a pair of steering cylinders 103a and 103b (refer to FIG. 2). The vehicle front part 101 is equipped with a front operating mechanism 104 and front wheels 105. On the other hand, the vehicle rear part 102 is equipped with a cabin 106 and rear wheels 107. The cabin 106 is provided with operational means including a driver's seat 108, a steering wheel 109, a control lever unit 110, an accelerator pedal (not illustrated), and an inching pedal (not illustrated). The front operating mechanism 104 includes a bucket 111 and a lift arm 112. The expansion and contraction of a bucket cylinder 114 causes the tilt/dump operation of the bucket 111. The expansion and contraction of an arm cylinder 113 causes the lift arm 112 to move up and down.

Figure 2:
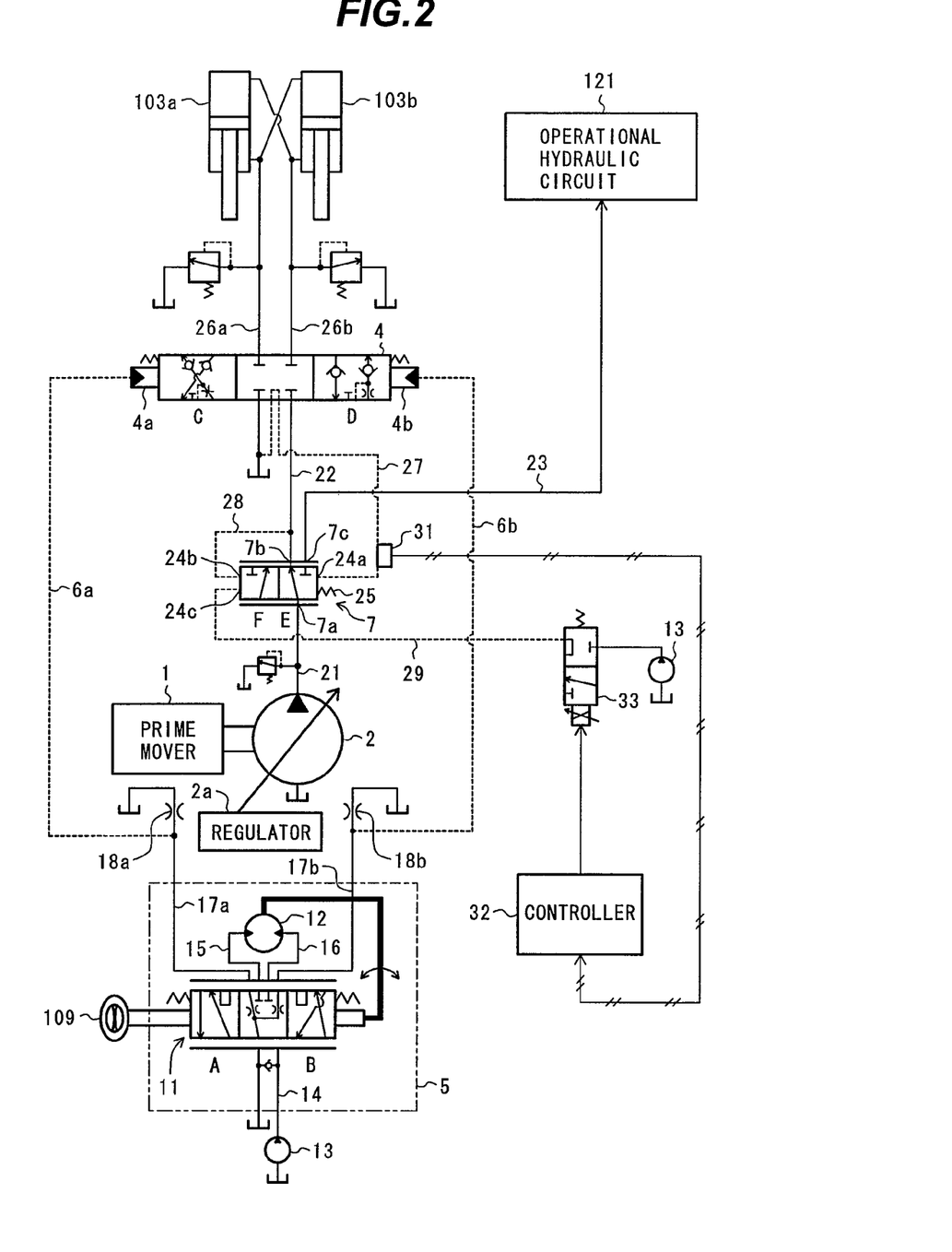
FIG. 2 is a diagram illustrating a steering system of an engineering vehicle according to a first embodiment of the present invention.

FIG. 2 is a diagram illustrating the steering system of an engineering vehicle according to a first embodiment of the present invention.

In FIG. 2, the steering system according to this embodiment includes: a prime mover (diesel engine) 1; a hydraulic pump 2 that is driven by the prime mover and including a variable displacement control unit (regulator 2a); the pair of steering cylinders 103a and 103b, each of which is driven by pressurized oil discharged from the hydraulic pump 2; a steering valve 4 for controlling the direction and flow of the pressurized oil supplied from the hydraulic pump 2 to the steering cylinders 103a and 103b; a hydraulic steering unit 5 that operates by the rotational operation of the steering wheel 109 with the steering wheel connected thereto and that generates a control pressure in response to the rotational quantity and rotational direction of the steering wheel 109 on the basis of the pressurized oil of a pilot pump 13 that is a pilot hydraulic fluid source; pilot lines 6a and 6b for introducing the control pressure generated by the hydraulic steering unit 5 into the pressure receiving units 4a and 4b of the steering valve 4, respectively; and a priority valve 7 disposed between the hydraulic pump 2 and the steering valve 4 and designed to control the differential pressure across a meter-in hydraulic line of the steering valve 4 so that the differential pressure is kept at a target value (described later) and to thereby supply by priority the steering cylinders 103a and 103b with the pressurized oil discharged from the hydraulic pump 2 and to supply an operational hydraulic circuit 121 with a surplus of the pressurized oil discharged from the hydraulic pump 2.

The operational hydraulic circuit 121 supplies pressurized oil to, for example, the bucket cylinder 114 and the arm cylinder 113, which are included in the above-mentioned front operating mechanism 104, so that the bucket 111 and the lift arm 112 are operated. The operational hydraulic circuit 121 includes a publicly known control valve unit.

The hydraulic steering unit 5 includes a metering valve 11 and a gerotor 12. When an operator manipulates the steering wheel 109, the metering valve 11 pivotally moves in response to the rotational direction of the steering wheel. As a result, the position of the metering valve 11 switches from the neutral position shown in FIG. 2 to either the left operating position A or the right operating position B.

After the metering valve 11 is switched to the position A, the pressurized oil from the pilot pump 13 is supplied to the gerotor 12 through a hydraulic line 14, the internal passage of the position A of the metering valve 11, and a hydraulic line 15. The supply of the pressurized oil causes the gerotor 12 to rotate. The pressurized oil which has passed through the gerotor 12 further passes through a hydraulic line 16, the internal passage of the position A of the metering valve 11, and a hydraulic line 17a. The pressurized oil is then returned to a tank by means of a restrictor 18a that is located in the hydraulic line 17a. In this case, the restrictor 18a generates a pressure in the hydraulic line 17a in response to the flow rate of the pressurized oil. That pressure is extracted as control pressure to the pilot hydraulic line 6a and then introduced into the pressure receiving unit 4a of the steering valve 4. After the control pressure is introduced into the pressure receiving unit 4a, the position of the steering valve 4 is switched from the neutral position shown in the figure to the left position C shown in the figure.

On the other hand, the rotational operation of the gerotor 12 is fed back to the metering valve 11. After the gerotor 12 measures the flow rate of the pressurized oil in response to a rotational operation amount of the steering wheel 109 (displacement of the metering valve 11) and rotates by a specified amount, the metering valve 11 returns to the neutral position. This blocks the supply of pressurized oil from the hydraulic line 14 to the hydraulic line 15. As a result, the pressure of the pressurized oil in the hydraulic line 17a becomes equivalent to the tank pressure; the control pressure, which is introduced into the pressure receiving unit 4a of the steering valve 4 through the pilot hydraulic line 6a, also becomes equivalent to the tank pressure. Consequently, the steering valve 4 returns to the neutral position shown in the figure.

When the metering valve is switched to the position B, the reverse of the above operation is performed. To be more specific, the pressurized oil from the pilot pump 13 is supplied to the gerotor 12 through the hydraulic line 14, the internal passage of the position B of the metering valve 11, and the hydraulic line 16. The supply of the pressurized oil causes the gerotor 12 to rotate. The pressurized oil which has passed through the gerotor 12 further passes through the hydraulic line 15, the internal passage of the position B of the metering valve 11, and a hydraulic line 17b. The pressurized oil is then returned to a tank by means of a restrictor 18b that is located in the hydraulic line 17b. In this case, the restrictor 18b generates a pressure in the hydraulic line 17b in response to the flow rate of the pressurized oil. That pressure is extracted as control pressure to the pilot hydraulic line 6b and then introduced into the pressure receiving unit 4b of the steering valve 4. After the control pressure is introduced into the pressure receiving unit 4b, the position of the steering valve 4 is switched from the neutral position shown in the figure to the right position D shown in the figure.

After the gerotor 12 measures the flow rate of the pressurized oil in response to a rotational operation amount of the steering wheel 109 (displacement of the metering valve 11) and rotates by a specified amount, the metering valve 11 returns to the neutral position. This blocks the supply of pressurized oil from the hydraulic line 14 to the hydraulic line 16. As a result, the pressure of the pressurized oil in the hydraulic line 17b becomes equivalent to the tank pressure; the control pressure, which is introduced into the pressure receiving unit 4a of the steering valve 4 through the pilot hydraulic line 6a, also becomes equivalent to the tank pressure. Consequently, the steering valve 4 returns to the neutral position shown in the figure.

The priority valve 7 includes an inlet port 7a and two outlet ports (first and second outlet ports) 7b and 7c. The inlet port 7a is connected to the hydraulic pump 2 through a hydraulic line 21. The first outlet port 7b is connected to the steering valve 4 through a hydraulic line 22. The second outlet port 7c is connected to the operational hydraulic circuit 121 through a hydraulic line 23. In addition, the priority valve 7 is a spool valve that can move between the right switching position E shown in the figure and the left switching position F shown in the figure. When the spool of the priority valve 7 is at the right position E shown in the figure, the communicating passage between the inlet port 7a and the first outlet port 7b is fully opened whereas the communicating passage between the inlet port 7a and the second outlet port 7c is fully closed. When the spool of the priority valve 7 is at the left position F shown in the figure, the communicating passage between the inlet port 7a and the first outlet port 7b is fully closed whereas the communicating passage between the inlet port 7a and the second outlet port 7c is fully opened. Moreover, as the spool of the priority valve 7 moves from the right position E to the left position F shown in the figure (more specifically, as it moves in the right direction in the figure), the aperture area of the communicating passage between the inlet port 7a and the first outlet port 7b is gradually narrowed (decreased) whereas the aperture area of the communicating passage between the inlet port 7a and the second outlet port 7c is gradually widened (increased). In contrast, as the spool of the priority valve 7 moves from the left position F to the right position E shown in the figure (more specifically, as it moves in the left direction in the figure), the aperture area of the communicating passage between the inlet port 7a and the second outlet port 7c is gradually narrowed (decreased) whereas the aperture area of the communicating passage between the inlet port 7a and the first outlet port 7b is gradually widened (increased).

In addition, the priority valve 7 includes: a pressure receiving unit 24a and a spring 25 that bias the spool of the priority valve 7 towards the right position E shown in the figure; and two pressure receiving units 24b and 24c that bias the spool of the priority valve 7 towards the left position F shown in the figure. Introduced into the pressure receiving unit 24a through a pilot hydraulic line 27 is the pressure on the outlet side of the steering valve 4 (the pressures of actuator hydraulic lines 26a and 26b between the steering valve 4 and the steering cylinders 103a and 103b, or the load pressures of the steering cylinders 103a and 103b). Introduced into the pressure receiving unit 24b through a pilot hydraulic line 28 is the pressure on the inlet side of the steering valve 4 (the pressure of the hydraulic line 22 between the priority valve 7 and the steering valve 4). Control pressure (described later) is introduced into the pressure receiving chamber 24c through a pilot hydraulic line 29.

Because the pressure receiving units 24a and 24b each bias the spool of the priority valve 7 in an opposite direction, the pressure on the outlet side of the steering valve 4 is introduced into the pressure receiving unit 24a, and the pressure on the inlet side of the steering valve 4 is introduced into the pressure receiving unit 24b. This means that the differential pressure across the meter-in hydraulic line of the steering valve 4 (hereinafter merely referred to as "the differential pressure across the steering valve 4" as necessary) works so as to bias the spool of the priority valve 7 in the right direction in the figure.

The spring 25 and the pressure receiving unit 24c constitute setting means for setting a target value of the differential pressure across the steering valve 4. When the differential pressure across the steering valve 4 which acts on the pressure receiving units 24a and 24b of the priority valve 7 becomes higher than the target value that is set by the spring 25 and the pressure receiving unit 24c, the spool of the priority valve 7 is moved in the right direction in the figure, and the aperture area of the communicating passage between the inlet port 7a and the first outlet port 7b is gradually narrowed to decrease the flow rate of the supply to the steering valve 4, thereby reducing the differential pressure across the steering valve 4. At this time, a surplus flow from the hydraulic pump 2 is supplied to the operational hydraulic circuit 121. In contrast, the differential pressure across the steering valve 4 which acts on the pressure receiving units 24a and 24b of the priority valve 7 becomes lower than the target value set by the spring 25 and the pressure receiving unit 24c, the spool of the priority valve 7 is moved in the left direction in the figure, and the aperture area of the communicating passage between the inlet port 7a and the first outlet port 7b is gradually widened to increase the flow rate of the supply to the steering valve 4, thereby increasing the differential pressure across the steering valve 4. With the above mechanism, the priority valve 7 controls the differential pressure across the meter-in hydraulic line of the steering valve 4 so that the differential pressure is kept at the target value set by the setting means constituted of the spring 25 and the pressure receiving unit 24c.

Here, the spring 25 sets a basic value (fixed value) of the above target value; the pressure receiving unit 24c adjusts the basic value by the control pressure, thereby setting the target value as a variable. The control pressure to be introduced into the pressure receiving unit 24c is set at a value smaller than a pressure value corresponding to the biasing force of the spring 25 so that the sum of the biasing force of the spring 25 and that of the pressure receiving unit 24c acts in the left direction in the figure.

In addition, the steering system according to this embodiment further includes: a pressure sensor 31 located in the pilot hydraulic line 27 to detect the load pressures of the steering cylinders 103a and 103b; a controller 32; and a solenoid valve 33. A detection signal of the pressure sensor 31 is inputted into the controller 32. The controller 32 performs specified arithmetic processing according to the input value and outputs a control current to the solenoid valve 33. The solenoid valve 33 operates with the control current and outputs a control pressure corresponding to the control current. This control pressure is introduced into the pressure receiving unit 24c of the priority valve 7 through the pilot hydraulic line 29.

Figure 3:
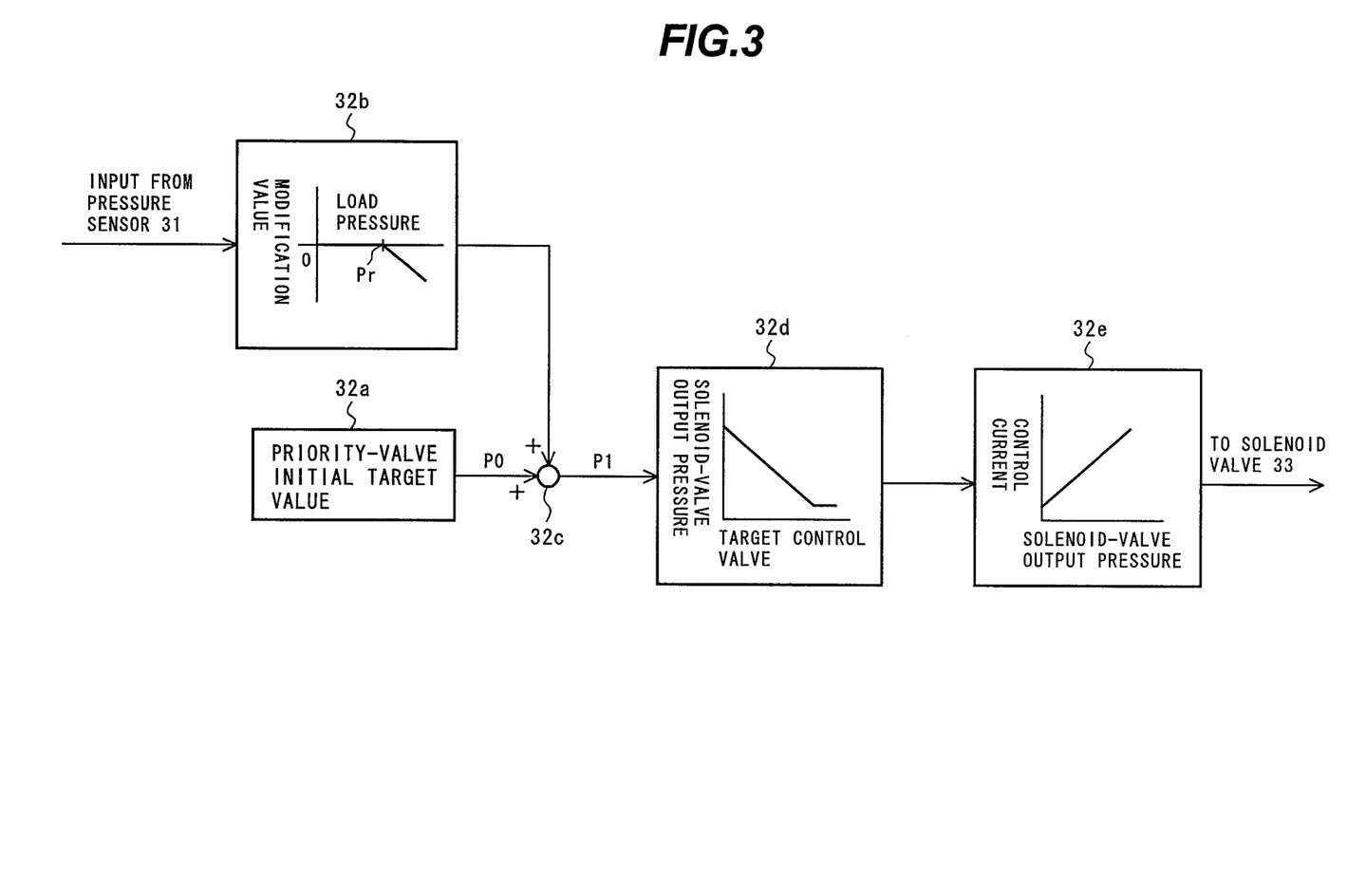
FIG. 3 is a functional block diagram illustrating processing by a controller.

FIG. 3 is a functional block diagram illustrating the processing of the controller 32. The controller 32 includes a priority-valve target value setting unit 32a, a modification value operation unit 32b, an addition unit (priority-valve target control value operation unit) 32c, a solenoid-valve output pressure operation unit 32d, and a solenoid-valve control current operation unit 32e.

The priority-valve initial target value setting unit 32a sets an initial target value P0 of the differential pressure across the steering valve 4. The initial target value P0 is to be set for the setting means that is constituted of the spring 25 and the pressure receiving unit 24c, both of which are included in the priority valve 7. Here, the initial target value P0 is set at 20 kg/cm$^2$, for example.

The modification value operation unit 32b calculates a modification value ΔPm for the priority valve target value based on the load pressure of the steering cylinders 103a and 103b. The modification value operation unit 32b inputs a detection signal from the pressure sensor 31 and then refers to a table stored in a memory to calculate the modification value ΔPm corresponding to the load pressure at that point of time. The table stored in the memory specifies the relationship between the load pressure and the modification value ΔPm in such a manner that if the load pressure is lower than a predetermined pressure value Pr, the modification value ΔPm is 0 and that if the load pressure exceeds the pressure value Pr, the modification value ΔPm decreases with increase in load pressure (in other words, the absolute value of the modification value increases with increase in load pressure after the modification value turns negative). Here, the pressure value Pr is the average value of the load pressures of the steering cylinders 103a and 103b at the time of a steady operation (refer to FIGS. 5 and 6).

The addition unit 32c is a priority-valve target control value operation unit. The addition unit 32c adds the modification value ΔPm to the priority valve initial target value P0 to calculate a target control value P1 to be set for the setting means of the priority valve 7.

Figure 4:
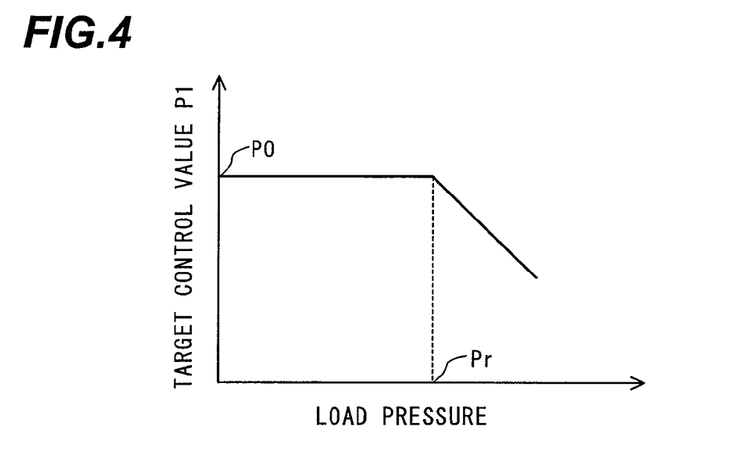
FIG. 4 is a graph illustrating the relationship between a load pressure and a target control value, which is the operation result of an addition unit.

FIG. 4 is a graph illustrating the relationship between the load pressure and the target control value P1, an operation result of the addition unit 32c. When the load pressure is lower than the predetermined pressure value Pr, the target control value P1 is equivalent to the initial target value P0. When the load pressure exceeds the pressure value Pr, the target control value P1 decreases with increase in load pressure.

The solenoid-valve output pressure operation unit 32d calculates an output pressure (control pressure) for the solenoid valve 33 to acquire the target control value P1 calculated by the addition unit 32c. The solenoid-valve output pressure operation unit 32d refers to a table stored in the memory for a set pressure so as to calculate the output pressure of the solenoid valve 33 corresponding to the set pressure. The table stored in the memory specifies the relationship between the target control value and the output pressure in such a manner that the output pressure decreases with increase in target control value. For example, assume that a pressure value (basic value) corresponding to the biasing force of the spring 25 toward the left direction of the figure is 30 kg/cm$^2$. When the target control value calculated by the addition unit 32c is 20 kg/cm$^2$, the solenoid-valve output pressure operation unit 32d calculates a control pressure of 10 kg/cm$^2$. When the target control value calculated by the addition unit 32c is 15 kg/cm$^2$, the solenoid-valve output pressure operation unit 32d calculates a control pressure of 15 kg/cm$^2$.

The solenoid-valve control current operation unit 32e calculates a control current (driving current) of the solenoid valve 33 to acquire the output pressure of the solenoid valve 33 determined by the solenoid-valve output pressure operation unit 32d. The solenoid-valve control current operation unit 32e refers to a table stored in the memory for a control current corresponding to the output pressure of the solenoid valve 33 determined by the solenoid-valve output pressure operation unit 32 so that the control current of the solenoid valve 33 corresponding to the output pressure is calculated. The table stored in the memory specifies the relationship between the output pressure and the control current in such a manner that the control current increases with increase in output pressure. This control current is amplified by an unillustrated amplifier and then output to the solenoid valve 33.

As described above, the pressure sensor 31 is pressure detection means for detecting the load pressures of the steering cylinders 103a and 103b; the controller 32, the solenoid valve 33, the pilot hydraulic line 29, and the pressure receiving unit 24c of the priority valve 7 constitute control means for modifying, on the basis of the load pressure detected by the pressure detection means, a target value set by the setting means of the priority valve 7.

Figure 5:
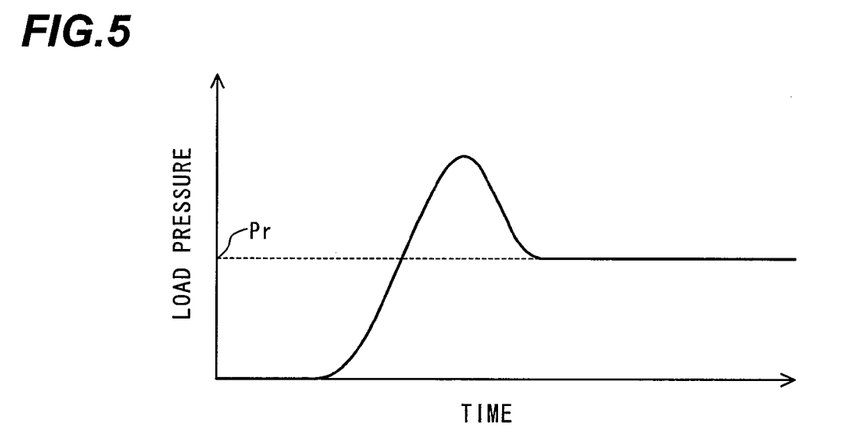
FIG. 5 is a graph illustrating the change in load pressure with time at the start of turning the steering wheel in a conventional steering system.
Figure 6:
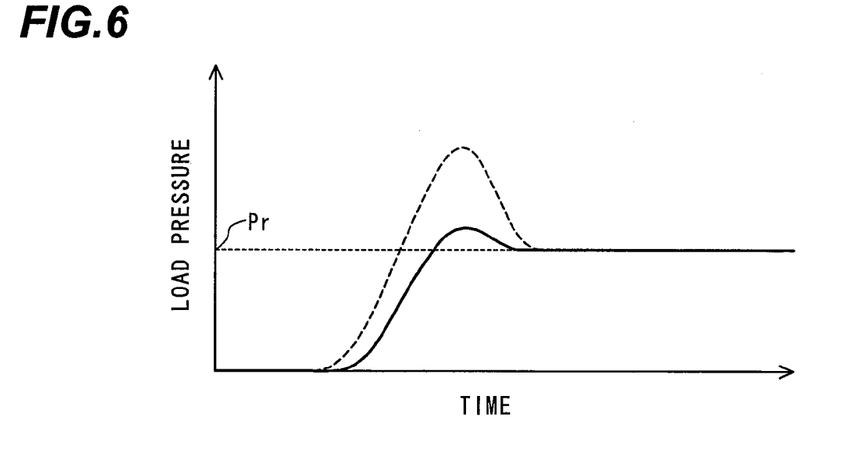
FIG. 6 is a graph illustrating the change in load pressure with time at the start of turning the steering wheel in the first embodiment.

Next, the operation according to the present embodiment configured as above will be described with reference to FIGS. 5 and 6.

Steering Operation

When an operator manipulates the steering wheel 109 to switch the metering valve 11 to, for example, the position A, the control pressure is generated in the hydraulic line 17a by the restrictor 18a as described above. This control pressure is then introduced into the pressure receiving unit 4a of the steering valve 4. This causes the steering valve 4 to be switched from the neutral position shown in the figure to the left position C shown in the figure. In this case, the differential pressure across the meter-in hydraulic line of the steering valve 4 is also controlled by the priority valve 7 such that the differential pressure is kept at a target value set by the setting means constituted of the spring 25 and the pressure receiving unit 24c. As a result, the pressurized oil whose flow rate has been measured and controlled by the steering valve 4 flows into the rod side of the steering cylinder 103a and into the bottom side of the steering cylinder 103b. Accordingly, the vehicle front part 101 of the wheel loader 100 bends, for example, in the left direction with respect to the vehicle rear part 102, which causes the wheel loader 100 to be steered in the left direction. When the operator manipulates the steering wheel 109 in the reverse direction to switch the metering valve 11 to the position B, the steering valve 4 is reversely switched to the right position D shown in the figure. As a result, the pressurized oil flows into the bottom side of the steering cylinder 103a and into the rod side of the steering cylinder 103b. Accordingly, the vehicle front part 101 of the wheel loader 100 bends in the right direction with respect to the vehicle rear part 102. This causes the wheel loader 100 to be steered in the right direction.

Steering Operation in the Prior Art

When the operator manipulates the steering wheel 109 by turning it, the weight of the vehicle front part 101 acts on the steering cylinders 103a and 103b as a heavy load. Therefore, in the case of a conventional steering system, the load pressures of the steering cylinders 103a and 103b sharply rise at the start of turning the steering wheel, which results in a shock. FIG. 5 is a graph illustrating the change in load pressure at this point of time. This shock deteriorates the operability at the start of turning the steering wheel.

Furthermore, the wheel loader 109 often needs to operate the front operating mechanism 101 while traveling. Also in such operation, when the load pressure rises at the start of turning the steering wheel, followed by a shock, work performance and a sense of maneuvering as a whole deteriorate.

Operation in this Embodiment

According to this embodiment, when an operator manipulates the steering wheel 109 by turning it, the load pressures of the steering cylinders 103a and 103b are detected by the pressure sensor 31. The resultant detection signal of the pressure sensor 31 is inputted into the modification value operation unit 32b of the controller 32. The modification value operation unit 32b then calculates a modification value ΔPm based on the load pressure. Next, the addition unit 32c adds the modification value ΔPm to a priority-valve initial target value P0 to calculate a target control value P1. A control current is then output to the solenoid valve 33 so that a target value, which is set by the spring 25 and the pressure receiving unit 24c that are included in the priority valve 7, becomes the target control value P1. The resultant control pressure which is output by the solenoid valve 33 is introduced into the pressure receiving unit 24c.

The target control value P1 herein mentioned, which has been calculated by the addition unit 32c, is a value that decreases with increase in load pressure when the load pressure exceeds a predetermined pressure value Pr as shown in FIG. 4. Therefore, before the load pressures of the steering cylinders 103a and 103b sharply rise at the start of turning the steering wheel, the target control value P1 is correspondingly modified such that it becomes smaller than the initial target value P0. In addition, the target value, which is set by the spring 25 and the pressure receiving unit 24c that are included in the priority valve 7, also decreases. As a result, the differential pressure across the steering valve 4 is also adjusted to a value smaller than the initial target value P0. Accordingly, the flow rate in the steering valve 4 decreases, and increase in load pressures of the steering cylinders 103a and 103b is suppressed. FIG. 6 is a graph illustrating the change in load pressure with time according to this embodiment.

With the above operation, the present embodiment enables suppression of a shock and improvement of the operability at the start of turning steering wheel.

Moreover, even when the front operating mechanism 101 is operated with the wheel loader in a traveling state, the shock occurring at the start of turning the steering wheel can be suppressed, which thus improves its work performance and a sense of maneuvering as a whole.

Other embodiments of the present invention will now be described.

Figure 7:
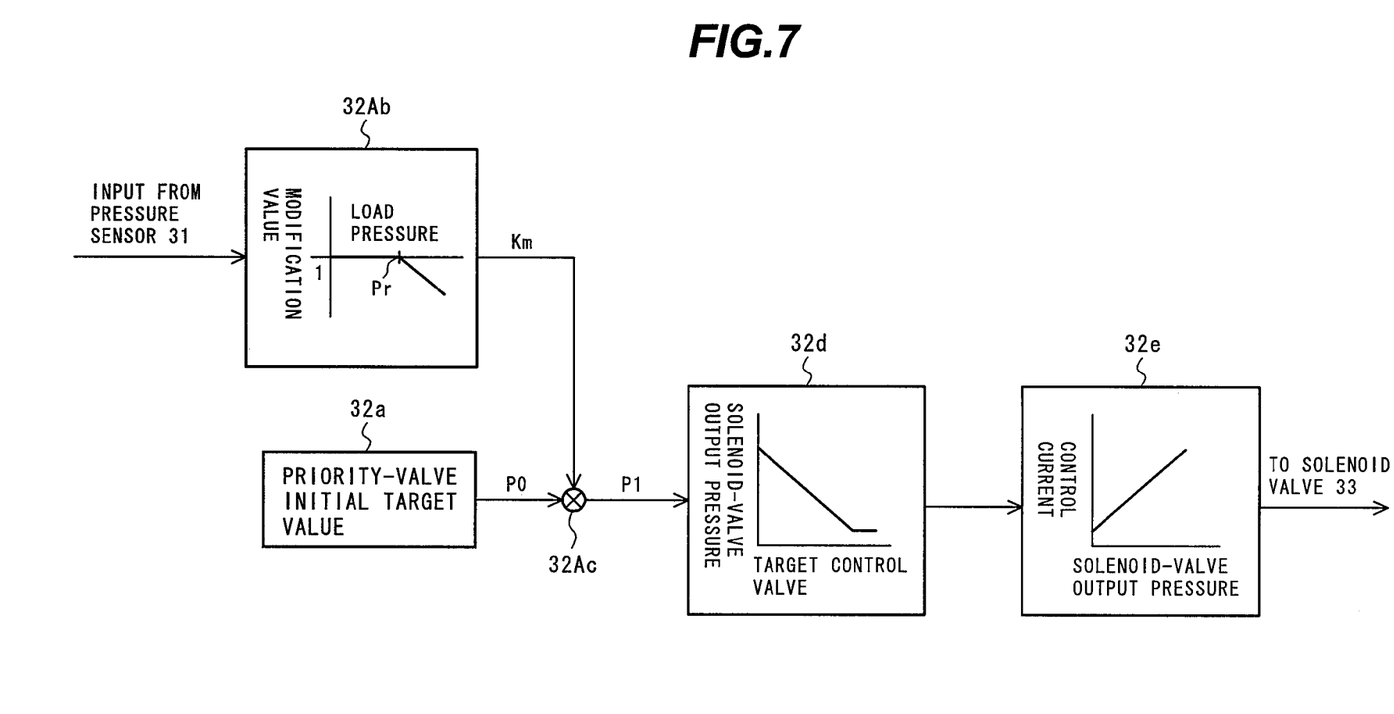
FIG. 7 is a functional block diagram illustrating processing by a controller included in a steering system of an engineering vehicle according to a second embodiment of the present invention.

FIG. 7 is a functional block diagram, similar to FIG. 3, illustrating processing by a controller according to a second embodiment of the present invention. The same reference numerals as in FIG. 3 denote identical parts.

According to this embodiment, the controller includes the priority-valve target value setting unit 32a, a modification coefficient operation unit 32Ab, a multiplication unit (priority-valve target control value operation unit) 32Ac, the solenoid-valve output pressure operation unit 32d, and the solenoid-valve control current operation unit 32e.

The modification coefficient operation unit 32Ab calculates a modification coefficient Km for a priority valve target value based on the load pressures of the steering cylinders 103a and 103b. The modification coefficient operation unit 32Ab inputs a detection signal from the pressure sensor 31 and then refers to a table stored in a memory to calculate the modification coefficient Km corresponding to the load pressures at that point of time. The table stored in the memory specifies the relationship between the load pressure and the modification coefficient Km in such a manner that when the load pressure is lower than a predetermined pressure value Pr, the modification coefficient Km is 1, and when the load pressure exceeds the pressure value Pr, the modification coefficient Km decreases with increase in load pressure.

The multiplication unit 32Ac is a priority-valve target control value operation unit. The multiplication unit 32Ac multiplies a priority-valve initial target value P0 by the modification coefficient Km to calculate a target control value P1 to be set for the setting means of the priority valve 7.

The operation of this embodiment is substantially the same as that of the first embodiment. Therefore, the same effects as those of the first embodiment can also be produced by this embodiment.

Figure 8:
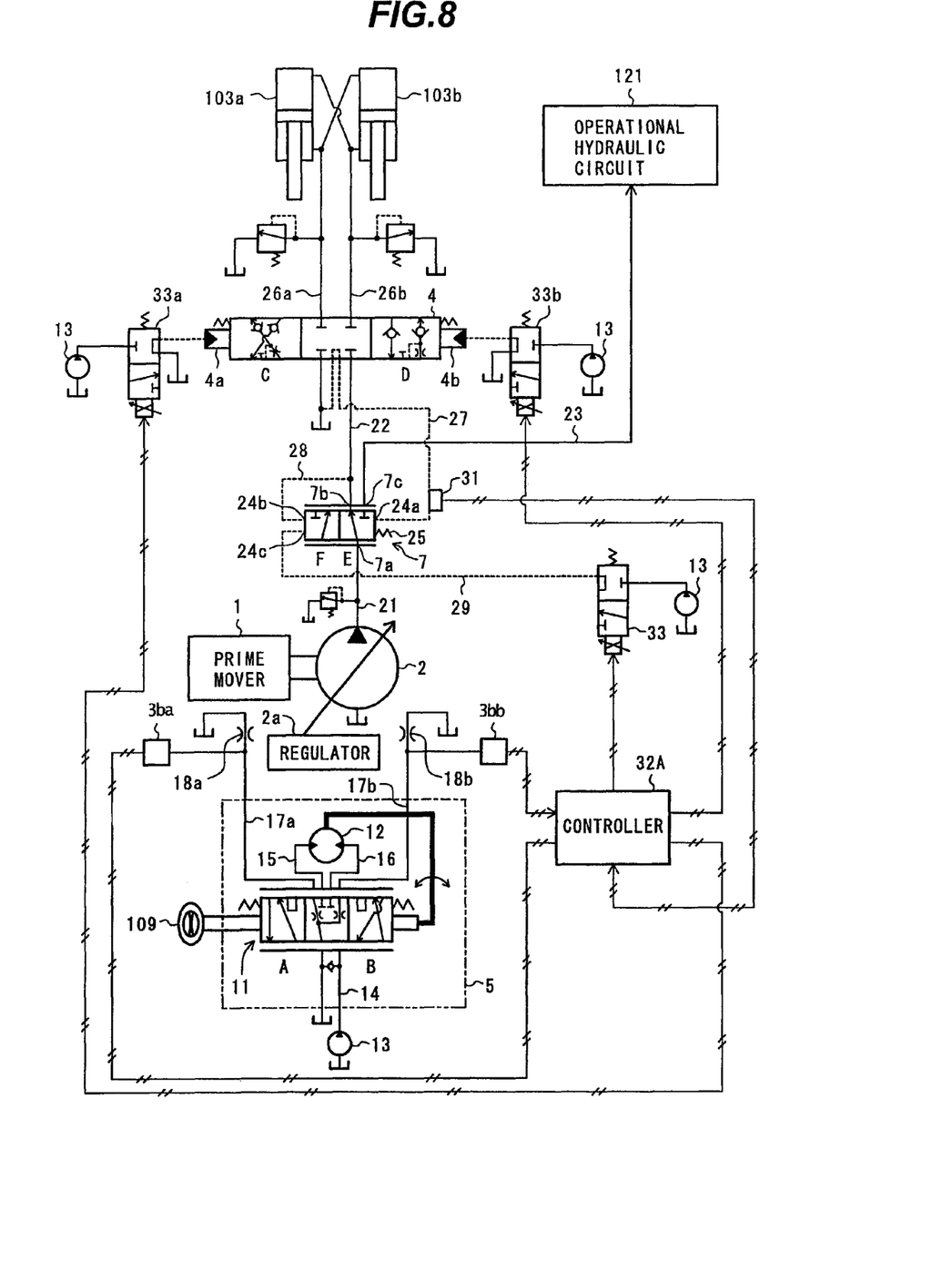
FIG. 8 is a diagram illustrating a steering system of an engineering vehicle according to a third embodiment of the present invention.

FIG. 8 is a diagram illustrating the steering system of an engineering vehicle according to a third embodiment of the present invention. The same reference numerals as in FIG. 1 denote identical parts.

The steering system according to this embodiment further includes: a pressure sensor 3ba for detecting a pressure (control pressure) that is generated in the hydraulic line 17a by the restrictor 18a; a pressure sensor 3bb for detecting a pressure (control pressure) that is generated in the hydraulic line 17b by the restrictor 18b; and solenoid valves 33a and 33b. Detection signals of the pressure sensor 3ba and 3bb are inputted into a controller 32A. The controller 32A performs specified arithmetic processing based on the input values and outputs specified control currents to the solenoid valves 33a and 33b.

The solenoid valves 33a and 33b operate with the respective control currents and output the driving pressures corresponding to the received control currents, which driving pressures are introduced into the pressure receiving units 4a and 4b of the steering valve 4, respectively. In addition, the controller 32A inputs a detection signal of the pressure sensor 31, performs specified arithmetic processing based on the input value, and outputs a control current to the solenoid valve 33. Since the processing to be performed in this case is the same as that performed by the controller 32 shown in FIGS. 3 and 7 of the first and second embodiments, respectively, a detailed description therefor is omitted.

The operation of this embodiment is also substantially the same as that of the first embodiment. Therefore, the same effects as those of the first embodiment can also be produced by this embodiment.

The invention claimed is:

1. A steering system for an engineering vehicle comprising:
   a hydraulic pump;
   a steering cylinder driven by pressurized oil discharged from the hydraulic pump;
   a steering valve for controlling the direction and flow rate of the pressurized oil supplied from the hydraulic pump to the steering cylinder; and
   a steering wheel manipulated by an operator,
   said steering system switching the steering valve based on the rotational direction and rotational quantity of the steering wheel so as to control the steering cylinder,
   wherein said steering system further includes:
   a priority valve that is located between the hydraulic pump and the steering valve and that includes setting means for setting a target value of the differential pressure across the steering valve, said priority valve supplying by priority the steering cylinder with the pressurized oil discharged from the hydraulic pump and supplying an operational actuator for driving an operating mechanism with a surplus flow of the pressurized oil, by controlling the differential pressure across the steering valve so that the differential pressure is kept at the target value; and
   pressure detection means for detecting the load pressure of the steering cylinder; and
   control means for modifying, on the basis of the load pressure detected by the pressure detection means, the target value set by the setting means of the priority valve,
   wherein, said control means modifies said target value such that when the load pressure is lower than a predetermined value, the target value is a constant value, and when the load pressure exceeds the predetermined value, the target value becomes smaller than the constant value.

2. A steering system for an engineering vehicle comprising:
   a hydraulic pump;
   a steering cylinder driven by pressurized oil discharged from the hydraulic pump;
   a steering valve for controlling the direction and flow rate of the pressurized oil supplied from the hydraulic pump to the steering cylinder; and
   a steering wheel manipulated by an operator,
   said steering system switching the steering valve based on the rotational direction and rotational quantity of the steering wheel so as to control the steering cylinder,
   wherein said steering system further includes:
   a priority valve that is located between the hydraulic pump and the steering valve and that includes setting means for setting a target value of the differential pressure across the steering valve, said priority valve supplying by priority the steering cylinder with the pressurized oil discharged from the hydraulic pump and supplying an operational actuator for driving an operating mechanism with a surplus flow of the pressurized oil, by controlling the differential pressure across the steering valve so that the differential pressure is kept at the target value; and pressure detection means for detecting the load pressure of the steering cylinder; and control means for modifying, on the basis of the load pressure detected by the pressure detection means, the target value set by the setting means of the priority valve, wherein, said control means includes:

a solenoid valve that operates with a control current and that outputs a control pressure corresponding to the control current;

a pressure receiving unit that is provided for the setting means of the priority valve, the pressure receiving unit changing based on the control pressure the target value set by the setting means; and     a controller for calculating, on the basis of the load pressure, a target value to be set for the setting means of the priority valve and for outputting the control current to the solenoid valve so as to set said target value for the setting means.

3. The steering system for an engineering vehicle according to claim 2, wherein:

said controller calculates a modification value for the target value set for the setting means of the priority valve and adds this modification value to a predetermined value to calculate the target value.

4. The steering system for an engineering vehicle according to claim 2, wherein:

said controller calculates a modification coefficient for the target value set for the setting means of the priority valve and multiplies a predetermined value by this modification coefficient to calculate the target value.

\* \* \* \* \*